(12) United States Patent
Brevick et al.

(10) Patent No.: US 10,118,624 B2
(45) Date of Patent: Nov. 6, 2018

(54) TORQUE CONVERTER HAVING VARIABLE PITCH STATOR AND BYPASS CLUTCH

(71) Applicant: Ford Global Technologies, LLC, Dearborn, MI (US)

(72) Inventors: John Edward Brevick, Livonia, MI (US); Steven Anatole Frait, Milan, MI (US); Vincent Patrick LaVoie, Canton, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 15/044,136

(22) Filed: Feb. 16, 2016

(65) Prior Publication Data

US 2016/0159363 A1    Jun. 9, 2016

Related U.S. Application Data

(63) Continuation-in-part of application No. 14/457,265, filed on Aug. 12, 2014, now Pat. No. 9,689,492.

(51) Int. Cl.
| | |
|---|---|
| *F16H 61/14* | (2006.01) |
| *B60W 30/19* | (2012.01) |
| *F16H 45/02* | (2006.01) |
| *F16D 48/08* | (2006.01) |
| *B60W 10/02* | (2006.01) |
| *B60W 10/10* | (2012.01) |
| *F16H 61/56* | (2006.01) |
| *F16H 41/26* | (2006.01) |

(52) U.S. Cl.
CPC ............ *B60W 30/19* (2013.01); *B60W 10/02* (2013.01); *B60W 10/10* (2013.01); *F16D 48/08* (2013.01); *F16H 41/26* (2013.01); *F16H 45/02* (2013.01); *F16H 61/143* (2013.01); *F16H 61/56* (2013.01)

(58) Field of Classification Search
CPC .. B60W 10/023; B60W 10/026; B60W 30/19; F16H 41/26; F16H 45/02; F16H 61/14; F16H 61/143; F16H 61/56; F16H 2061/145; F16H 2061/146
See application file for complete search history.

(56) References Cited

U.S. PATENT DOCUMENTS

| | | | |
|---|---|---|---|
| 1,129,720 | A | 2/1915 | Patterson |
| 2,339,483 | A | 1/1944 | Jandasek |
| 2,382,034 | A | 8/1945 | Wemp |
| 2,389,174 | A | 11/1945 | Whitworth |

(Continued)

FOREIGN PATENT DOCUMENTS

| | | |
|---|---|---|
| JP | 08114262 A | 5/1996 |
| JP | H108114262 A | 5/1996 |

*Primary Examiner* — Edwin A Young
(74) *Attorney, Agent, or Firm* — James Dottavio; Brooks Kushman P.C.

(57) ABSTRACT

A transmission includes a torque converter with both a variable pitch stator and a bypass clutch. These are controlled in two modes to maintain a target slip speed. In a first mode, the bypass clutch is fully released and slip is controlled by varying the pitch of the stator blades. In a second mode, the stator is held in the tightest position and slip is controlled by varying the torque capacity of the bypass clutch. The target slip is calculated based on a variety of different input signals depending on what type of vehicle maneuver is being performed.

17 Claims, 11 Drawing Sheets

(56) References Cited

U.S. PATENT DOCUMENTS

| | | | |
|---|---|---|---|
| 2,400,622 A | 5/1946 | Althoff | |
| 2,501,771 A | 3/1950 | Gray | |
| 2,871,792 A | 2/1959 | Mead | |
| 2,909,034 A | 10/1959 | Jandasek | |
| 2,929,214 A | 3/1960 | Stump et al. | |
| 2,944,402 A | 7/1960 | Russell | |
| 2,944,441 A | 7/1960 | Russell | |
| 2,995,955 A | 8/1961 | Kelley | |
| 3,886,729 A | 6/1975 | Amann et al. | |
| 3,934,414 A | 1/1976 | Merkle et al. | |
| 4,047,383 A | 9/1977 | Johnson et al. | |
| 5,217,476 A | 6/1993 | Wishinsky | |
| 5,307,629 A | 5/1994 | By et al. | |
| 7,500,548 B2 | 3/2009 | Kimes et al. | |
| 8,991,578 B2 | 3/2015 | Tanaka et al. | |
| 8,997,956 B2 | 4/2015 | Iwase et al. | |
| 2008/0254941 A1* | 10/2008 | Scott | F16H 61/143 477/169 |
| 2009/0065319 A1* | 3/2009 | Brees | F16H 45/02 192/3.29 |
| 2009/0229937 A1* | 9/2009 | Heeke | F16H 41/26 192/3.25 |
| 2015/0114779 A1 | 4/2015 | Frait et al. | |

\* cited by examiner

TORQUE CONVERTER HAVING VARIABLE PITCH STATOR AND BYPASS CLUTCH

CROSS-REFERENCE TO RELATED APPLICATIONS

This application is a continuation-in-part of U.S. application Ser. No. 14/457,265 filed Aug. 12, 2014, now U.S. Pat. No. 9,689,492, which issued on Jun. 27, 2017, the disclosure of which is hereby incorporated in its entirety by reference herein.

TECHNICAL FIELD

This disclosure relates to the field of automotive transmissions. More particularly, the disclosure pertains to a torque converter having a variable pitch stator.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Even with a very high speed ratio selected, the gearbox input speed is zero when the vehicle is stationary. Since an internal combustion engine is incapable of generating torque at zero shaft speed, some type of launch device is typically employed between the engine and the gearbox input shaft. A common launch device for automatic transmissions is a fluid coupling. A fluid coupling is a hydrodynamic torque transfer device having an impeller and a turbine in a torus shape surrounding the transmission axis. When the impeller rotates faster than the turbine, the impeller causes fluid to rotate in the torus exerting torque on the turbine and a resistance torque on the impeller. A torque converter is a fluid coupling that also includes a stator that is held against rotation. The stator redirects the flow such that the torque applied to the turbine is greater than the resistance torque on the impeller. When the vehicle is stationary, the turbine is also stationary but the impeller may be coupled to the engine crankshaft. Due to the speed difference between impeller and turbine, the impeller resists rotation of the crankshaft. The resistance torque is small enough that it does not stall the engine. However, the engine must consume additional fuel, beyond that required for unloaded idle, in order to overcome the resistance torque. A multiple of the engine torque is transmitted to the gearbox input which is coupled to the turbine.

SUMMARY OF THE DISCLOSURE

A transmission includes a torque converter and a controller. The torque converter includes an impeller, a turbine, a variable pitch stator, and a bypass clutch. In a first mode, the controller is programmed to adjust the torque capacity of the bypass clutch to maintain a target slip between the turbine and the impeller while maintaining the stator pitch at a setting corresponding to a tightest torque converter characteristic. The controller transitions to a second mode in response to the torque capacity decreasing to zero. In the second mode, the controller is programmed to adjust the stator pitch to maintain the target slip while maintaining the torque capacity at zero. The controller returns to the first mode in response to the stator pitch reaching the tightest setting. The target slip may be based on various criteria depending on what type of maneuver is being performed. During a launch event, the target slip may be based on a pedal position, a vehicle speed, a manifold pressure, an atmospheric pressure, a road gradient, and/or a vehicle mass. During a shift event, the target slip may be based on an engine torque and/or an elapsed time. During a torque reversal event, the target slip may be based on an engine torque.

A method of controlling a transmission includes repetitively measuring a slip speed and adjusting a torque capacity of a bypass clutch and a stator pitch. While the stator pitch is in a fully tight condition, the torque capacity if the bypass clutch is adjusted based on the slip speed. While the bypass clutch is fully disengaged, the stator pitch is adjusted based on the slip speed. In some embodiments, both stator pitch and bypass clutch torque capacity may be controlled by varying a current to a single solenoid. In other embodiments, the two may be adjusted using two separate solenoids.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
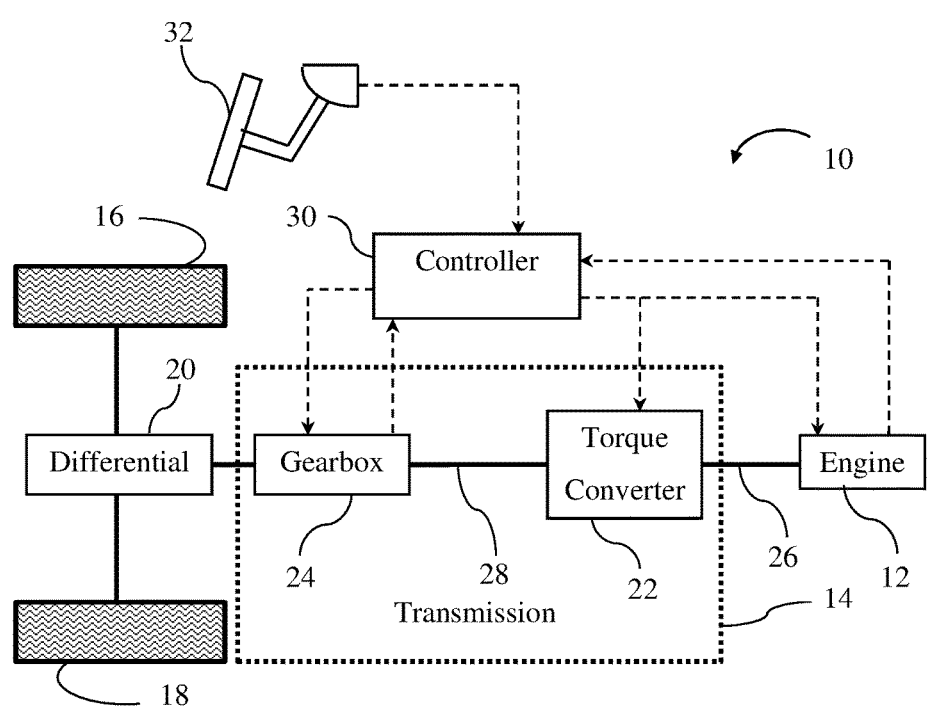
FIG. 1 is a schematic diagram of an exemplary vehicle powertrain.

FIG. 1 schematically illustrates a vehicle powertrain 10. The heavy lines indicate the flow of mechanical power, whereas the dashed lines indicate the flow of information. An internal combustion engine 12 generates mechanical power by converting stored chemical energy in a fuel source. Transmission 14 adapts the speed and torque of the mechanical power produced by the engine to suit the current needs of the vehicle. Mechanical power from transmission 14 is routed to left and right wheels 16 and 18 by differential 20. Differential 20 provides roughly equal torque to each wheel while accommodating slight differences in speed such as when the vehicle turns a corner. In a rear wheel drive vehicle layout, the differential also changes the axis of rotation by roughly 90 degrees and adjusts the speed and torque by a fixed final drive ratio. In a front wheel drive configuration, the differential may be integrated into the transmission, which may be called a transaxle.

The transmission 14 includes two power transfer stages, a torque converter 22 and a gearbox 24. Transmission input shaft 26 is fixedly driveably connected to the engine crankshaft. The torque converter transmits power and torque from transmission input shaft 26 to turbine shaft 28. The gearbox 24 provides a number of speed ratios including multiple forward speed ratios and at least one reverse speed ratio. Gearbox 24 may include a number of controllable clutches that are engaged in various combinations to establish various power flow paths with differing fixed speed ratios. Alternatively or in combination, gearbox 24 may include a variator capable of establishing any speed ratio between fixed limits.

The gearbox, torque converter, and engine respond to commands from controller 30. Commands to the gearbox clutches and the torque converter may be conveyed by adjusting an electrical current which, in turn, adjust a pressure of a fluid in a piston apply chamber. Controller 30 determines a desired state of the transmission and engine based signals from various sensors. These sensors may include transmission and engine sensors which indicate the speeds of transmission input shaft 26, turbine shaft 28, and the transmission output shaft. The sensors may also include a driver operated accelerator pedal 32 indicating driver power demand. Controller 30 may be a dedicated controller or a combination of separate communicating controllers such as a vehicle system controller, a transmission controller, and an engine controller.

Figure 2:
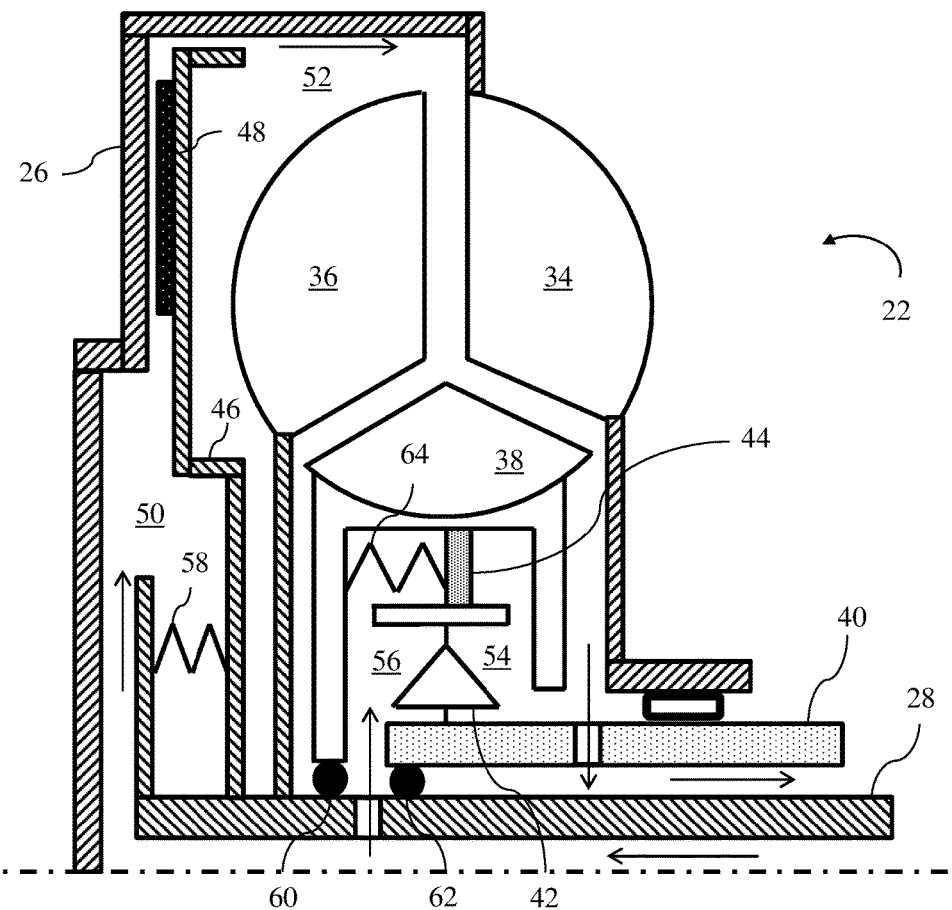
FIG. 2 is a schematic cross section of a first torque converter assembly configured to control a bypass clutch and stator pitch using two fluid passages.

FIG. 2 schematically illustrates a first embodiment of torque converter 22. A hydrodynamic power flow path includes impeller 34 and turbine 36. Impeller 34 is fixedly coupled to transmission input shaft 26 which is adapted for fixation to an engine crankshaft. Turbine 36 is fixedly coupled to turbine shaft 28. Stator 38 is coupled to transmission housing 40 by passive one way clutch 42. At low turbine shaft speeds, impeller 34 causes fluid to flow around the torus from impeller 34 to turbine 36 to stator 38 and back to impeller 34. Stator 38 is held against rotation by one way clutch 42 such that it can redirect the flow and provide a reaction torque for torque multiplication. As the speed of turbine 36 approaches the speed of impeller 34, fluid in the torus flows circumferentially around the input shaft with the impeller and turbine. One way clutch 42 then overruns such that stator 38 can rotate rather than impeding this flow.

Power flow through the hydrodynamic power flow path is governed by the speed of impeller 34 and the speed of turbine 36. The relationship between the speeds and the torques is a complex function of torus geometry and of the blade angles of the impeller, turbine, and stator. At a constant turbine speed, both impeller torque and turbine torque increase as impeller speed increases. A torque converter designed to exert a higher resistance torque on the impeller at a given impeller and turbine speed is called a stiffer or tighter converter, whereas a torque converter designed to exert a lower torque for the same impeller and turbine speed is called a looser converter. The stiffness of a torque converter may be expressed as a K-factor or capacity characteristic that relates the impeller torque to the impeller speed. A low K-factor indicates a tight converter while a high K-factor indicates a loose K-factor. The ratio of turbine torque to impeller torque generally increases as the ratio of impeller speed to turbine speed increases. However, based on conservation of power, the torque ratio is never greater than the speed ratio. The product of the speed ratio and the torque ratio is the converter efficiency, which varies between zero and one as a function of impeller speed and turbine speed. The torque ratio when the turbine is stationary is called the stall torque ratio. Torque converter design often involves compromises between achieving the desired stiffness, maximizing efficiency, and maximizing torque ratio. The most advantageous combination of properties differs for different vehicle operating conditions. Piston 44 is connected via a mechanical linkage to the blades of stator 38, such that moving the piston changes the pitch of the stator blades, changing the K-factor and torque ratio.

Transmission input shaft 26 is selectively coupled to turbine shaft 28 by a bypass clutch providing a second power flow path. The bypass clutch includes a piston 46 fixedly coupled to turbine shaft 28 and having friction material 48 facing a portion of the input shaft 26. The torque capacity of the bypass clutch is proportional to the force with which the friction material is pressed against the input shaft. When the vehicle is cruising at moderate speeds, the power required is generally low and fuel efficiency is important. Often, the bypass clutch may be engaged during cruise to transmit the engine torque to the turbine shaft with very high efficiency. However, in some conditions, especially at lower speeds with high gearbox speed ratios, the bypass clutch may be disengaged because the torsional vibration isolation provided by the hydrodynamic power flow path is needed. In these circumstances, torque converter efficiency is very important. An excessively loose converter will permit too much speed difference between the engine and the turbine shaft, lowering efficiency. Also, a larger speed difference between the engine and the turbine shaft makes engaging the bypass clutch more difficult to execute smoothly.

In the torque converter of FIG. 2, stator pitch and bypass clutch torque capacity are both controlled using only two fluid passageways. Arrows in FIG. 2 indicate the direction of fluid flow when the bypass clutch is disengaged. Fluid flows from a valve body, through an axial passageway in turbine shaft 28, to release chamber 50. From there, it flows past friction material 48 into apply chamber 52. The gap between friction material 48 and input 26 is small enough to cause a pressure drop between release chamber 50 and apply chamber 52. From apply chamber 52, the fluid flows between impeller 34 and turbine 36 into the hydrodynamic chamber. Fluid flows out of the hydrodynamic chamber between the stator 38 and the impeller 34. From there, the fluid flows through a hole in stator shaft 40 and back to the valve body between the stator shaft and the turbine shaft. Tightening chamber 54 is fluidly connected to the passageway between the stator shaft and the turbine shaft. Two chambers are fluidly connected if the flow resistance between them is small enough that they can be considered to have substantially the same pressure. Conversely, chambers connected by small orifices or by a pump are not fluidly connected even though fluid may flow between them. Piston 46 is held in the disengaged position by the pressure difference between release chamber 50 and apply chamber 52 and also by return spring 58.

Loosening chamber 56 is fluidly connected to the release chamber 50 by a hole in turbine shaft 28. At the interface between shafts that rotate at different speeds, the passageway between release chamber 50 and loosening chamber 56 is defined by seals 60 and 62 which isolates this passageway from other chambers. When the bypass clutch is fully disengaged, the pressure in loosening chamber 56 is higher than the pressure in tightening chamber 54. This pressure difference, in combination with the force exerted by spring 64, push piston 44 to right, which corresponds to the loosest converter characteristic.

Figure 3:
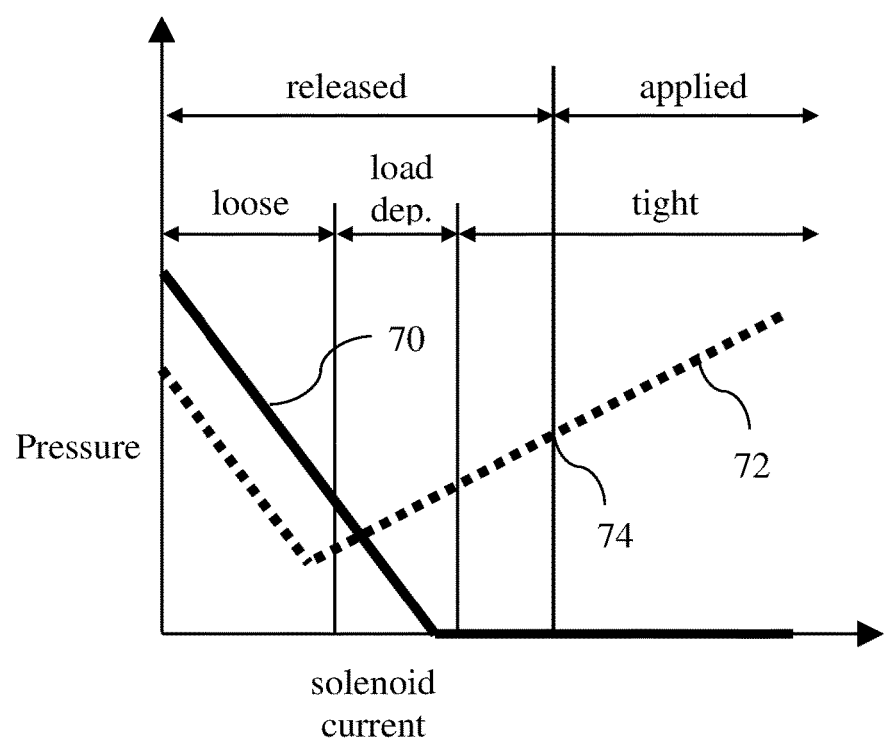
FIG. 3 is a graph illustrating the pressures in the two fluid passages of the torque converter assembly of FIG. 2 as a function of a single solenoid current.

FIG. 3 illustrates how the controller commands the stator pitch and clutch capacity for the torque converter of FIG. 2. The controller commands a solenoid current. In response to this solenoid current, one or more valves in the valve body adjust the fluid pressures in two circuits. The pressure in the first circuit, which is fluidly connected to release chamber 50 via the center of turbine shaft 28, follows curve 70. The pressure in the second circuit, which is fluidly connected to tightening chamber 54 via the space between turbine shaft 28 and stator shaft 40, follows curve 72.

At zero current, the pressure in the first circuit forces piston 46 to the released position and forces piston 44 to the loose pitch position. The pressure in the second circuit is less than the pressure in the first circuit due to fluid resistance past the piston. As the solenoid current increases, both pressures decrease at the same rate until a threshold is reached. Beyond the threshold, the valve body starts to increase the pressure in the second circuit as solenoid current increases. The pressure balance on piston 44 is such that hydrodynamic forces may move the stator pitch away from loosest position for some engine torques and speed ratios. This is called a load dependent region. As the solenoid increased further, a point is reached at which the pressure balance on piston 44 forces the stator pitch to the tightest position for all engine torques and speed ratios. The spring rate of return spring 64 is selected such that these transition thresholds are appropriate. When the solenoid current is increased further yet, a point 74 is reached at which the pressure in the apply chamber 52 exceeds the pressure in the release chamber 50 by enough to overcome return spring 58 and push piston 46 into the engaged position. Increasing solenoid pressure beyond this point increased clutch torque capacity.

Figure 4:
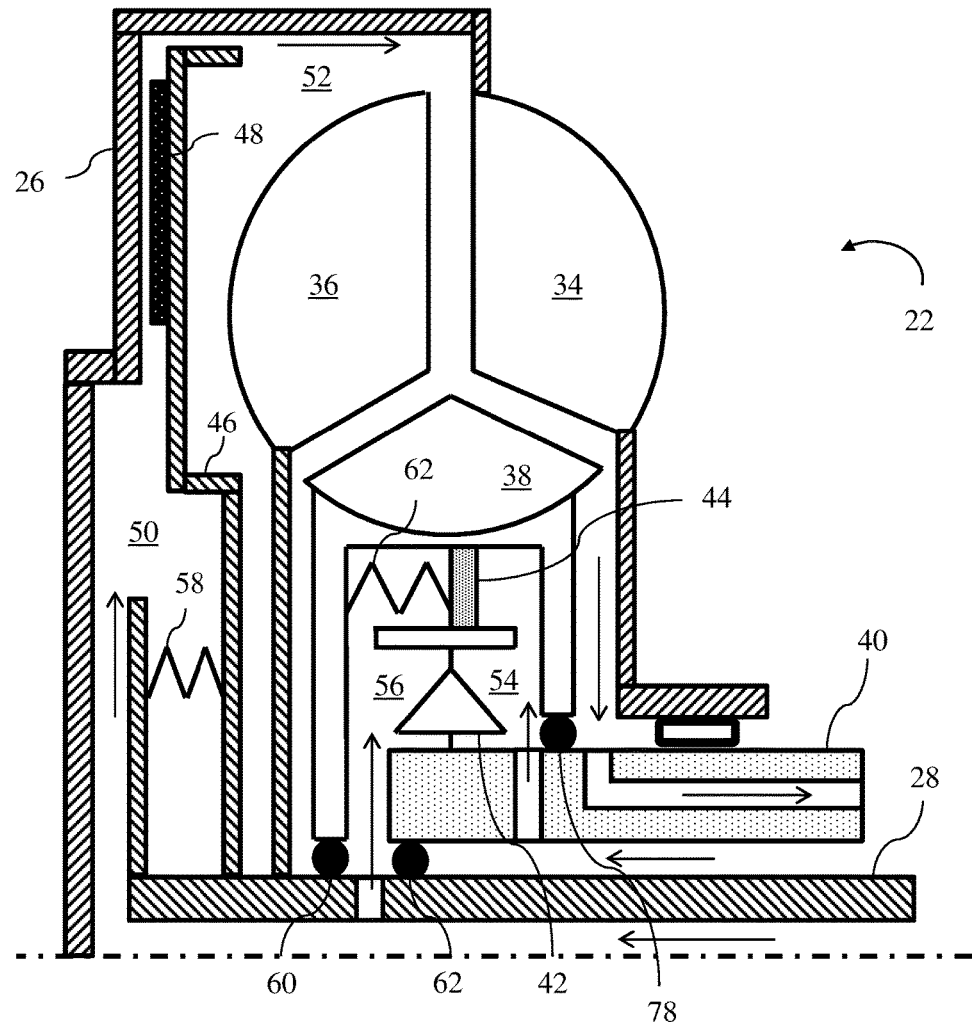
FIG. 4 is a schematic cross section of a second torque converter assembly configured to control a bypass clutch and stator pitch using three fluid passages.

FIG. 4 illustrates a torque converter with a variable pitch stator and a bypass clutch which can be independently controlled by a total three fluid passageways. The additional passageway is formed within stator shaft 40 which requires stator shaft 40 to have a wider cross section than in FIG. 2. Although FIG. 4 shows the cross section of stator shaft 40 as having the same thickness for its entire length, a variable thickness cross section may be preferable in some circumstances. Fluid returning from the hydrodynamic chamber when the clutch is disengaged or entering the hydrodynamic chamber when the clutch is applied is routed through this new passageway. Fluid is routed to tightening chamber 54 via the fluid passageway between stator shaft 40 and turbine shaft 28 and then through a hole in stator shaft 40. Seal 78 separates these two passageways.

Figure 5:
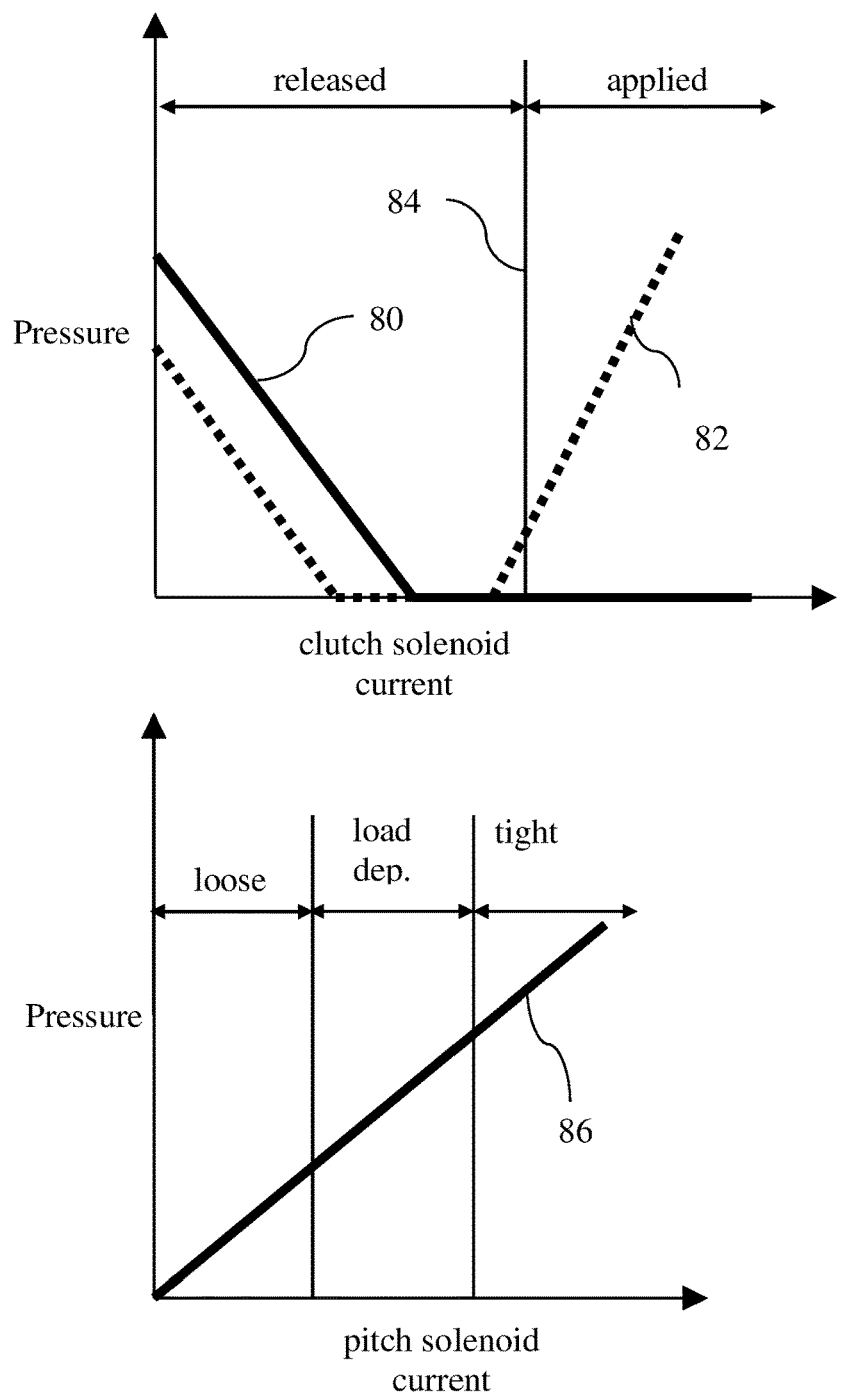
FIG. 5 is a pair of graphs illustrating the pressures in the three fluid passages of the torque converter assembly of FIG. 4 as a function of two solenoid currents.
Figure 9:
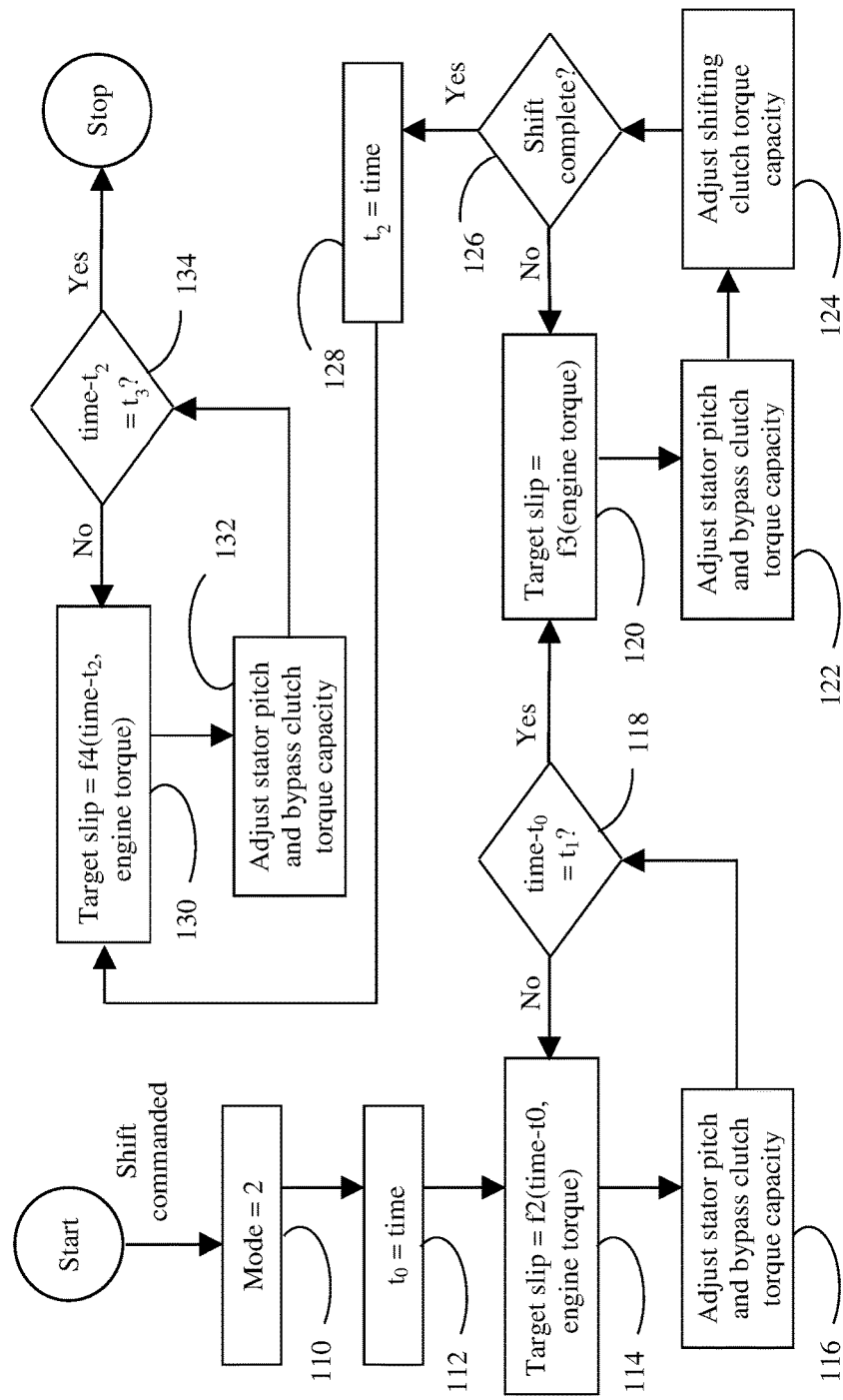
FIG. 9 is a flow chart for a method of controlling a torque converter having a variable pitch stator and a bypass clutch during a shift event.

FIG. 5 illustrates how the controller commands a stator pitch and clutch capacity for the torque converter of FIG. 9. The controller commands two solenoid currents. In response to these solenoid currents, valves in the valve body adjust the fluid pressures in three circuits. The pressure in the first circuit, which is fluidly connected to release chamber 50 via the center of turbine shaft 28, follows curve 80. The pressure in the second circuit, which is fluidly connected to hydrodynamic chamber via the stator shaft follows curve 82. The pressure in apply chamber 52 tracks the pressure in the second circuit subject to any impact of impeller 34. To disengage the clutch, the controller sets the clutch solenoid current to zero. To apply the clutch, the controller increases the clutch solenoid current. When pressure 82 exceeds pressure 80, the direction of fluid flow reverses. To the right of line 84, the clutch torque capacity increases as clutch solenoid current increases. The position of line 84 can be adjusted by selecting an appropriate spring rate for spring 58, which is optional in this configuration.

The pressure in a third circuit, which is fluidly connected to tightening chamber 54 via the gap between stator shaft 40 and turbine shaft 28, follows curve 86. The controller adjusts pitch solenoid current to adjust the pitch of the stator blades. The controller can adjust the stator blade pitch regardless of the state of the clutch. However, the boundaries between the loose, load dependent, and tight ranges are dependent on the pressure in the first circuit, so the controller must compensate accordingly.

Figure 6:
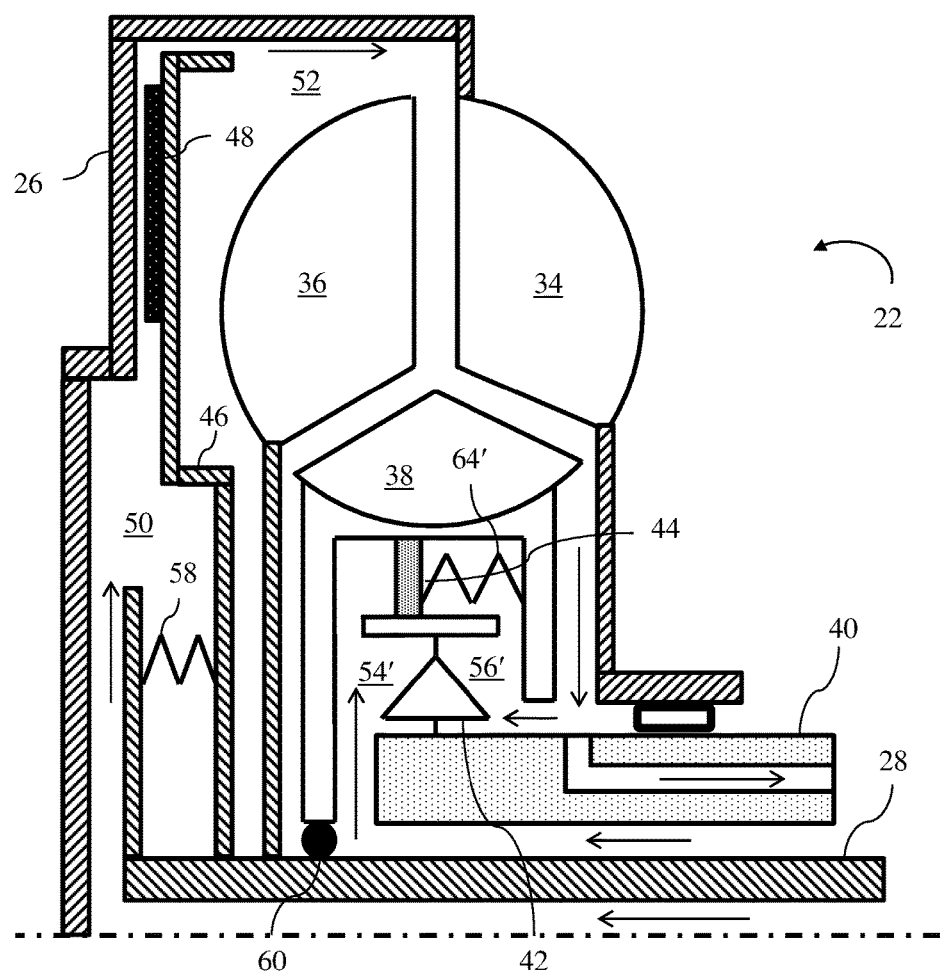
FIG. 6 is a schematic cross section of a third torque converter assembly configured to control a bypass clutch and stator pitch using three fluid passages.

FIG. 6 illustrates a torque converter with a variable pitch stator and a bypass clutch which can be independently controlled by a total three fluid passageways. Whereas the loosening chamber 56 in FIGS. 2 and 4 are fluidly connected to the release chamber 50, loosening chamber 56' in FIG. 6 is fluidly connected to the passageway through which fluid returns from the hydrodynamic chamber when the clutch is disengaged. Operation of the converter of FIG. 6 is similar to operation of the converter of FIG. 4. However, the boundaries between the loose, load dependent, and tight ranges are dependent on pressure 82 as opposed to pressure 80. Since pressure 82 tends to be near zero for many of the conditions in which the controller would adjust stator pitch, less compensation is required.

Figure 7:
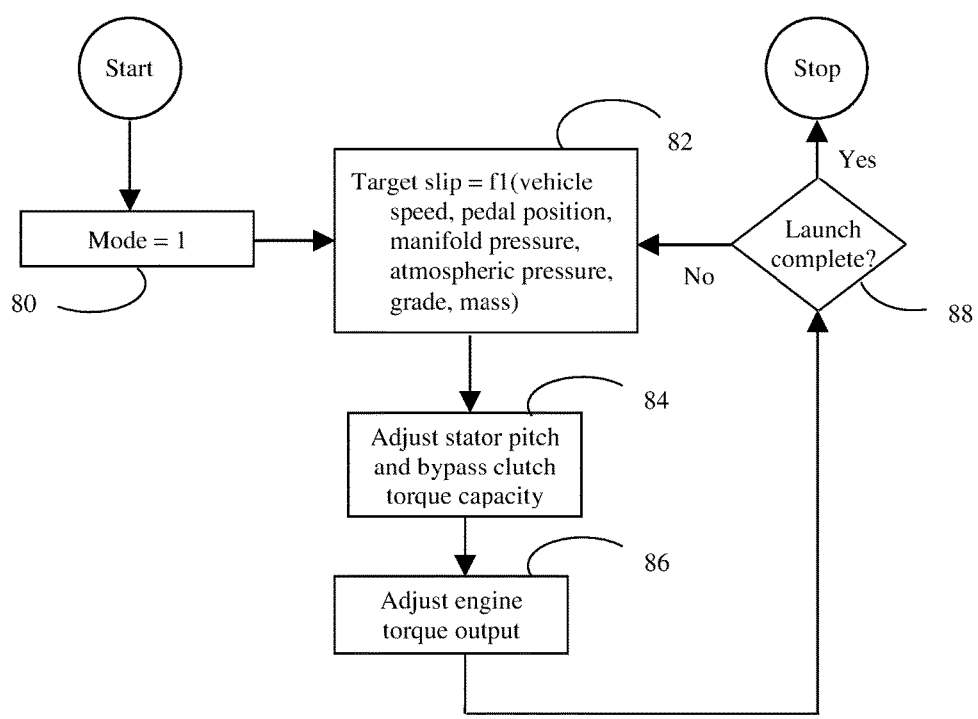
FIG. 7 is a flow chart for a method of controlling a torque converter having a variable pitch stator and a bypass clutch during a launch event.
Figure 8:
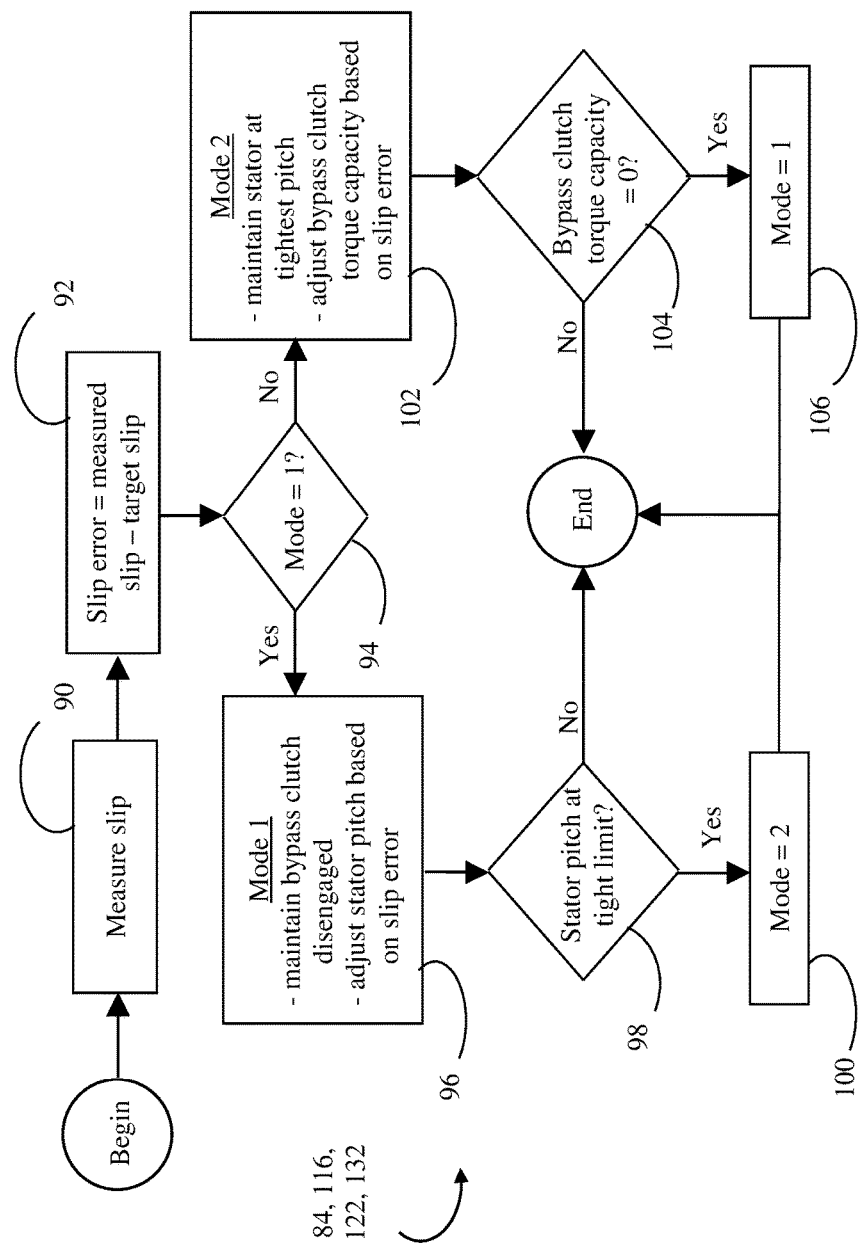
FIG. 8 is a flow chart for a method of controlling a variable pitch stator and a bypass clutch as a function of a target slip.

FIGS. 7 and 8 illustrate a process for controlling the stator pitch and bypass clutch torque capacity during a vehicle launch maneuver. When the vehicle is stationary, slip across a launch device is required such that the engine can operate at a sufficient speed to produce torque. During a launch maneuver, the vehicle transitions from stationary to a speed at which slip across the launch device is no longer required for proper engine operation (although it may still be desirable for other reasons). At 80, a mode variable is initialized to 1.

At 82, the controller calculates a target slip across the torque converter. The target slip may be a function of various parameters including vehicle speed, accelerator pedal position, manifold pressure, atmospheric pressure, road grade, and estimated vehicle mass. In general, target slip decreases as vehicle speed increases because progressively less slip is required for a given engine speed. Other speeds that are proportional to vehicle speed throughout the launch maneuver, such as transmission output shaft speed or turbine speed, may be used as surrogates for vehicle speed. Accelerator pedal position, in combination with vehicle speed, indicates the driver power demand. In general, target slip increases as accelerator pedal position increases because higher engine speeds are required to generate more power. An engines torque output is closely related to manifold air pressure. With a turbo-charged engine, manifold pressure may increase only gradually during the launch maneuver. To compensate for this, target slip may increase when manifold pressure is lower, resulting in higher engine speed. The higher engine speed results in more immediate torque and also increased the rate of increase of manifold pressure. The controller may also consider ambient atmospheric pressure. When atmospheric pressure is low, such as at high altitude, manifold pressure builds more slowly. Therefore, target slip may be increased as atmospheric pressure decreases. Finally, road gradient and vehicle mass both influence the relationship between transmission output torque and vehicle acceleration. On steep grades and/or high mass, the controller may increase the target slip to provide better acceleration at a given pedal position.

The controller has several mechanisms to adjust the slip toward the target. Tightening the torque converter by adjusting stator pitch and increasing the torque capacity of the bypass clutch both increase the load on the engine tending to decrease slip. These parameters are adjusted at 84 according to the process illustrated in FIG. 8 and described in detail below. Increasing engine torque output tends to increase slip. Engine torque output is adjusted at 86. At 88, the controller determines whether to repeat steps 82, 84, and 86 based on whether the launch maneuver is finished. For example, the controller may determine that the launch is complete when the target slip decreases below a threshold.

FIG. 8 illustrates the process by which stator pitch and bypass clutch torque capacity are adjusted at 84. The actual slip is measured at 90 and used at 92 to calculate the slip error. The slip may be measured by directly measuring the speed of the impeller and the turbine and subtracting. Alternatively, the impeller speed and/or the turbine speed may be inferred from some other measured speed. At 94, the process branches depending upon which mode is active, as indicated by the mode variable. In a first mode, at 96, the bypass clutch is set in the fully disengaged position and the stator pitch is adjusted based on slip error. Specifically, if the slip error is positive (more slip than desired), the stator pitch is adjusted to tighten the torque converter. Conversely, if the slip error is negative (less slip than desired), the stator pitch is adjusted to loosen the torque converter. If, after the adjustment, the stator pitch is at its tightest position at 98, then the mode variable is set to 2 at 100 to alter future executions of the sub-process of FIG. 8. In a second mode, at 102, the stator pitch is maintained in the tightest condition while the bypass clutch torque capacity is adjusted based on slip error. If, after the adjustment, the bypass clutch torque is fully released at 104, then the mode variable is set to 1 at 106 to alter future executions of the sub-process of FIG. 8.

Figure 10:
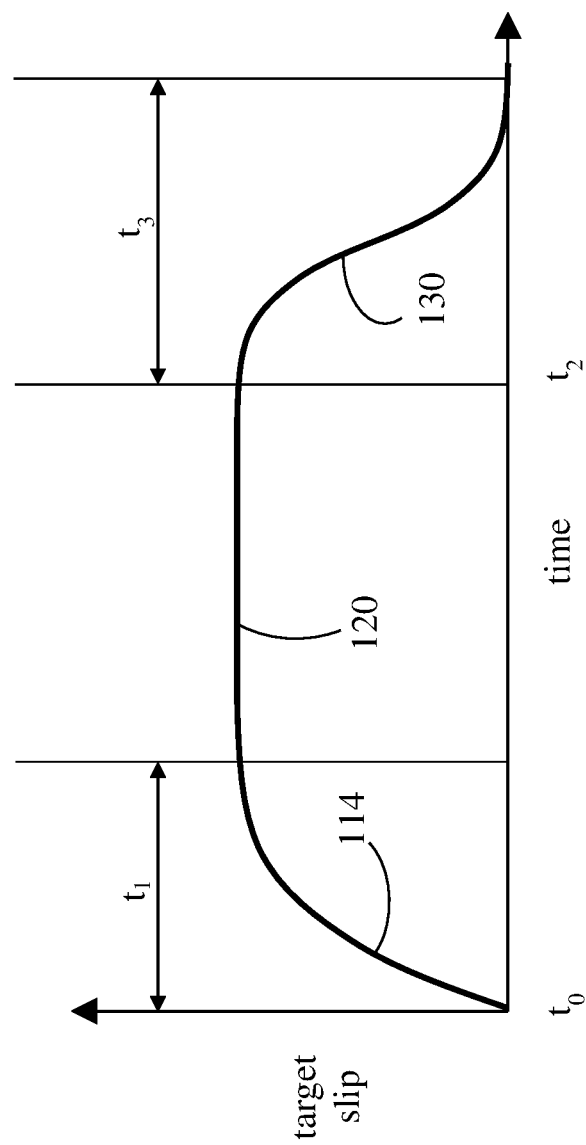
FIG. 10 is a graph illustrating the target slip profile as a function of time during a shift event.

FIGS. 9 and 10 illustrate a process for controlling the stator pitch and bypass clutch torque capacity during a transmission shift event. Slip is desirable during a shift to reduce the occurrence of torque disturbances at the output shaft which vehicle occupants may find objectionable. Since slip reduces transmission efficiency, excessive or prolonged slip should be avoided. At 110, the mode variable is initialized to 2. At 112, the initial time is recorded as $t_0$. At 14, the controller calculates a target slip across the torque converter as a function of time and other parameters such as engine torque. In general, target slip increases as engine torque increases because the magnitude of potential torque disturbances increases. Engine torque may be used directly or, equivalently, some other torque that is proportional to engine torque throughout the shift event may be used. The target slip gradually increases as a function of time as illustrated in FIG. 10. At 116, the stator pitch and bypass clutch torque capacity are adjusted to achieve the target slip according to the sub-process of FIG. 8. After $t_1$ seconds, the process moves into the slip maintenance phase at 118.

During the slip maintenance phase, the target slip is calculated at 120 as a function of engine torque only. This slip is achieved using the sub-process of FIG. 8 at 122. It is during this phase that the controller adjusts the torque capacities of the shifting clutches in order to effectuate the shift at 124. This phase stops at 126 when the controller determines the shift is complete. This may be determined, for example, by the gearbox speed ratio reaching the new value. The time of transitioning to the ramp down phase is recorded at 128 as $t_2$. At 130, the target slip is computed as indicated in FIG. 10 to smoothly reduce the slip to zero over a period of $t_3$ seconds. The target slip is achieved at 132 using the sub-process of FIG. 8. Termination of the process is determined at 134.

Figure 11:
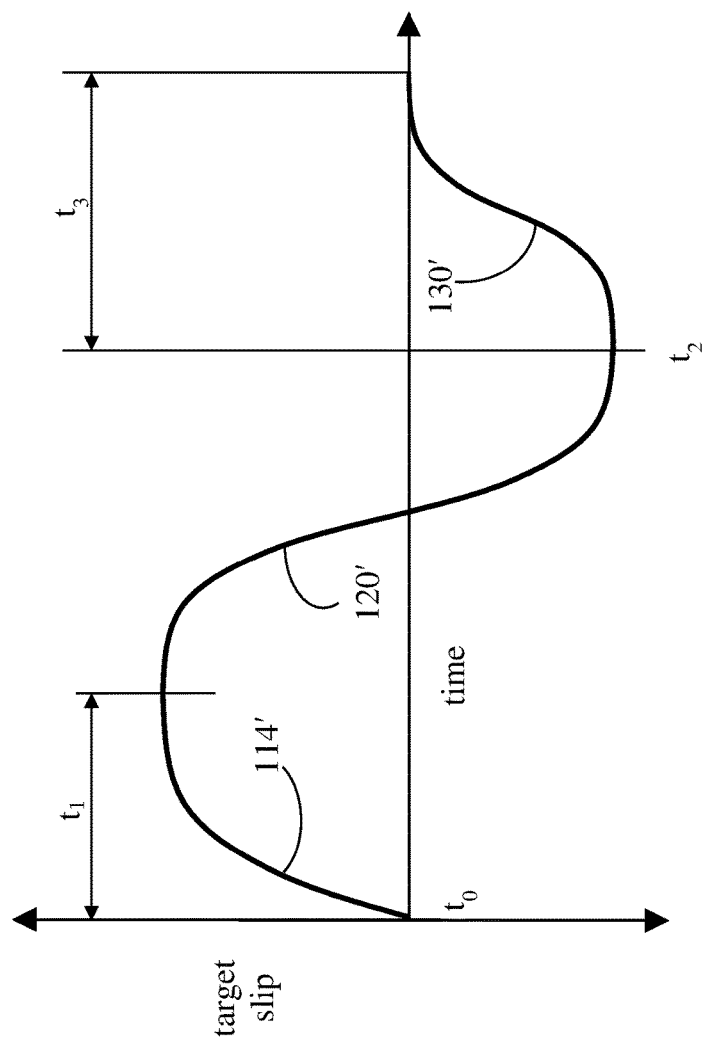
FIG. 11 is a graph illustrating the target slip profile as a function of time during a torque reversal event.

Although FIGS. 9 and 10 refer to a shift event, the process may be used with minor modifications for other types of events that benefit from controlled torque converter slip, such as tip-in events in which the driver requests a rapid increase in power. FIG. 11 illustrates how the target slip functions in each phase should be modified to handle a torque reversal event to mitigate lash crossing noise. In the middle phase, the target slip transitions from positive to negative as the engine torque (or some other representative torque) changes direction. In addition to slip control associated with discrete events, the process of FIG. 8 can be used to control slip for longer term situations such as NVH mitigation during low engine speed (lugging) operation and cylinder deactivation operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a torque converter having an impeller, a turbine, a variable pitch stator, and a bypass clutch; and
   a controller programmed to
      in a first mode, adjust a bypass clutch torque capacity to maintain a target slip between the turbine and the impeller while maintaining the stator at a pitch setting corresponding to a tightest torque converter characteristic;
      transition to a second mode in response to the torque capacity decreasing to zero;
      in the second mode, adjust the stator pitch to maintain the target slip while maintaining the torque capacity at zero; and
      return to the first mode in response to the stator pitch reaching the pitch setting.

2. The transmission of claim 1 wherein the controller is further programmed to, during a vehicle launch event, compute the target slip based on a pedal position and a vehicle speed.

3. The transmission of claim 2 wherein the target slip is further based on a manifold pressure.

4. The transmission of claim 2 wherein the target slip is further based on an atmospheric pressure.

5. The transmission of claim 2 wherein the target slip is further based on a road gradient.

6. The transmission of claim 2 wherein the target slip is further based on a vehicle mass.

7. The transmission of claim 1 wherein the controller is further programmed to, during a shift event, compute the target slip based on an engine torque.

8. The transmission of claim 7 wherein the target slip is further based on an elapsed time.

9. The transmission of claim 1 wherein the controller is further programmed to, during a torque reversal event, compute the target slip based on an engine torque.

10. A method of controlling a transmission comprising:
    repetitively measuring a slip speed between a turbine and an impeller;
    while a stator pitch is in a fully tight condition, adjusting a torque capacity of a bypass clutch based on the slip speed; and
    while the bypass clutch is fully disengaged, adjusting the stator pitch based on the slip speed.

11. The method of claim 10 wherein adjusting the torque capacity of the bypass clutch and adjusting the stator pitch both comprise varying a current to a single solenoid.

12. The method of claim 10 wherein adjusting the torque capacity of the bypass clutch comprises varying a first current to a first solenoid and adjusting the stator pitch comprises varying a second current to a second solenoid.

13. A method of accelerating a vehicle comprising:
    adjusting a stator pitch based on a target slip derived from a pedal position and a vehicle speed and on a measured slip between a turbine and an impeller while a bypass clutch is fully released; and
    in response to the stator reaching a tightest condition, adjusting a torque capacity of the bypass clutch based on the target slip and the measured slip.

14. The method of claim 13 wherein the target slip is further derived from a manifold pressure.

15. The method of claim 13 wherein the target slip is further derived from an atmospheric pressure.

16. The method of claim 13 wherein the target slip is further derived from a road gradient.

17. The method of claim 13 wherein the target slip is further derived from a vehicle mass.

* * * * *